Patented Nov. 27, 1945

2,389,607

UNITED STATES PATENT OFFICE 2,389,607

PREPARATION OF ALKENYL CYANIDES

Edgar C. Britton, Howard S. Nutting, and Myron E. Huscher, Midland, Mich., assignors to The Dow Chemical Company, Midland, Mich., a corporation of Michigan No Drawing. Application August 24, 1940, Serial No. 354,106

9 Claims. (Cl. 260—464)

This invention concerns an improved method of making alkenyl cyanides, particularly vinyl cyanide.

It is known that alkenyl cyanides may be prepared by the dehydration of beta-hydroxy-alkyl cyanides, as illustrated by the following equation for the formation of vinyl cyanide from beta-hydroxy-ethyl cyanide:

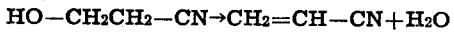

The dehydration has heretofore been carried out either by reacting the hydroxy-alkyl cyanide with a chemical agent, such as phosphorus pentoxide, which combines chemically with the water, or by heating the hydroxy-alkyl cyanide in the presence of a dehydration catalyst, e. g. activated charcoal, aluminum oxide, zinc chloride, or sodium bisulphate, etc., and distilling the alkenyl cyanide and water from the reaction zone as they are formed. The first of these usual methods requires the use of an expensive dehydrating agent which cannot readily be recovered in a form suitable for reemployment. The second method, i. e. that involving the employment of a dehydration catalyst, produces the alkenyl cyanides in undesirably low yields together with by-products.

We have found that the low yields of alkenyl cyanides obtained in the above catalytic dehydration method are due principally to reaction between the organic cyanides and the water to form ammonia and to reaction between the ammonia and the unsaturated organic compounds present, e. g. the alkenyl cyanide, to form other by-products.

Such side reactions take place not only in the presence of the dehydration catalyst and probably in the vapors above the catalyst, but also in the receiving vessel used to collect the mixture of water and alkenyl cyanide distilled from the catalyst chamber. In fact, during heating of a beta-hydroxy-alkyl cyanide with a dehydration catalyst in such manner as to distill off the alkenyl cyanide and water as they are formed, the side reactions usually occur to greatest extent in the distillate. For instance, we have found that when beta-hydroxy-ethyl cyanide was heated for only 5 hours with a dehydration catalyst while distilling off and collecting the vinyl cyanide and water as formed, the vinyl cyanide then present in the distillate corresponded to only about 90 per cent of the vinyl cyanide distilled, i. e. about 10 per cent of the vinyl cyanide in the distillate was destroyed due to side reactions during the 5 hour period over which the distillate was collected. It may be mentioned that the undesired side reactions occur in both the aqueous and the alkenyl cyanide layers of the distillate, since both of said layers contain sufficient vinyl cyanide, water, and ammonia to cause the reactions.

We have now found that the above mentioned side reactions, which lower the yields of alkenyl cyanides from the catalytic dehydration of beta-hydroxy-alkyl cyanides, may be prevented by treating the moist alkenyl cyanide with acid, preferably in amount sufficient to neutralize any ammonia or other basic nitrogen compound therewith.

During the production of an alkenyl cyanide by heating a beta-hydroxy-alkyl cyanide with a dehydration catalyst and distilling off the alkenyl cyanide and water as formed, it is most important that the distillate be treated with acid, since, as hereinbefore pointed out, it is in the distillate that the reactions which destroy the alkenyl cyanide product take place to greatest extent. Any acid or acidic compound capable of neutralizing ammonia, e. g. sulphuric acid, hydrochloric acid, acetic acid, oxalic acid, benzoic acid, etc., may be admixed directly with the distillate to sabilize the alkenyl cyanide product. The acid is usually employed in amount corresponding to between 1 and 5 per cent by weight of the alkenyl cyanide, but it may be used in smaller or larger proportion if desired. It may be used in a proportion considerably greater than that required to neutralize the ammonia present. When using a strong mineral acid such as sulphuric or hydrochloric acid in the treatment, care should be taken not to employ it in a proportion sufficiently large to cause polymerization of the alkenyl cyanide product.

In practice we preferably introduce a volatile organic acid into the reaction mixture in the catalyst chamber or into the vapors thereabove so that the material distilled from the reaction mixture will comprise the alkenyl cyanide and water formed by the reaction and also sufficient of the volatile organic acid to neutralize any ammonia in the distillate. By operating in this preferred manner, the alkenyl cyanide product is stabilized immediately after formation and the yield is thereby improved. As the volatile organic acid, we preferably employ formic or acetic acid, but other organic acids such as propionic and butyric acids, etc., may be used. The volatile organic acid is usually employed in amount corresponding to between 5 and 10 per cent of the weight of the alkenyl cyanide reactant, but it may be employed in smaller or larger proportions, if desired.

As alternative procedure, a mixture of a beta-hydroxy-alkyl cyanide and a volatile organic acid may be vaporized and the vapors be passed over the dehydration catalyst and then condensed.

By treating the alkenyl cyanide product with an acid during its preparation according to any of the procedures just described, the yield thereof is improved over that obtained in the absence of the acid, regardless of the particular dehydration catalyst used. Accordingly, any of the usual dehydration catalysts for such reaction may be employed. However, we usually employ metallic aluminum or an aluminum compound, e. g. aluminum oxide, aluminum acetate, basic aluminum acetate, or aluminum nitrate, etc., as the catalyst, since such catalytic materials are readily available at low cost and are highly effective in promoting the reaction. The catalyst is usually employed in amount corresponding to 1 per cent or less of the weight of the beta-hydroxy-alkyl cyanide reactant, but it may be used in larger proportions if desired.

The beta-hydroxy-alkyl cyanide employed as a reactant is preferably of good purity, but crude beta-hydroxy-alkyl cyanides containing small amounts of water and inorganic salts, e. g. alkali or alkaline earth metal salts, may be used.

As will be evident from the foregoing description of several ways in which the invention may be practiced, the catalytic reaction to form an alkenyl cyanide may be carried out by heating a beta-hydroxy-alkyl cyanide to boiling or above in the presence of a dehydration catalyst. The reaction is preferably carried out at atmospheric pressure or thereabout, but it may be carried out at other pressures, e. g. at any pressure between 5 and 30 pounds per square inch, absolute. It is preferably carried out in the presence of an organic acid which will vaporize or distill together with the alkenyl cyanide and water formed by the reaction, but it may be carried out in the absence of such acid, provided that the condensed products are treated with acid.

It will also be evident that the method may be practiced in continuous or batchwise manner as desired. However, regardless of the mode of operation employed, it is important that the alkenyl cyanide product be vaporized from the catalyst chamber as it is formed, since it tends to polymerize and/or decompose quite rapidly when heated, particularly in the presence of the dehydration catalyst.

The alkenyl cyanide may be recovered by usual purification procedures, e. g. redistillation.

The following examples describe a number of ways in which the principle of the invention has been applied, but are not to be construed as limiting the same.

*Example 1*

The purpose of this example is to present data illustrating the improvement in yield of alkenyl cyanide which is brought about by carrying out the catalytic dehydration of a beta-hydroxy-alkyl cyanide in the presence of a volatile organic acid. In each of two experiments, beta-hydroxy-ethyl cyanide was fed gradually into a heated still which was provided with a fractionating column containing pieces of aluminum oxide, while distilling vinyl cyanide and water from the mixture as they were formed. The aluminum oxide served both as packing for the column and as the dehydration catalyst. The apparatus and the operating conditions employed in the two experiments were the same, except that in one of the experiments beta-hydroxy-ethyl cyanide alone was fed to the still, whereas in the other experiment a mixture of beta-hydroxy-ethyl cyanide and acetic acid, which mixture contained 7.2 per cent by weight of the acid, was fed into the distilling system. The distillate collected in each experiment separated on standing into layers. The organic layer was separated from the aqueous layer and fractionally distilled to obtain the vinyl cyanide product. The yield of vinyl cyanide in the experiment carried out in the absence of acetic acid was 72.9 per cent of theoretical based on the beta-hydroxy-ethyl cyanide fed into the still. The yield of vinyl cyanide in the experiment carried out in the presence of acetic acid was 84.6 per cent of theoretical, on the same basis.

*Example 2*

A mixture of 648 grams of beta-hydroxy-ethyl cyanide and 39 grams of formic acid was distilled and the vapors passed over alumina and condensed as in Example 1. There was obtained 398 grams of vinyl cyanide, corresponding to a yield of 85.2 per cent of the theoretical.

*Example 3*

A mixture of 150 grams of beta-hydroxy-ethyl cyanide, 40 grams of formic acid, and 5 grams of alumina was placed in a flask fitted with a dropping funnel, reflux condenser, and receiver. The mixture was heated to the reflux temperature (approximately 220° C.), whereby the vinyl cyanide and water formed in the reaction was distilled off and condensed. During the reaction, additional beta-hydroxy-ethyl cyanide and formic acid was added to replace that consumed in the reaction. From a total of 648 grams of beta-hydroxy-ethyl cyanide there was obtained 568 grams of condensate which was distilled to obtain a two-layer distillate containing a total of 406 grams of vinyl cyanide, corresponding to a yield of 84 per cent of the theoretical.

*Example 4*

Approximately 150 grams of a mixture consisting of 648 grams of beta-hydroxy-ethyl cyanide and 50 grams of formic acid, together with 5 grams of basic aluminum acetate, was placed in a flask fitted with a dropping funnel and an 11-plate glass bubble-cap distillation column connected to a condenser and receiver. This mixture was heated to a temperature of about 220° C., while the remainder of the cyanide-formic acid mixture was added from the dropping funnel over a period of about 5 hours. The condensate obtained weighed 623 grams and contained 428 grams of vinyl cyanide, corresponding to a yield of 88.6 per cent of the theoretical.

*Example 5*

A mixture of 37.3 pounds of 96 per cent beta-hydroxy-ethyl cyanide, 2.3 pounds of acetic acid, and 1.0 pound of basic aluminum acetate, was placed in a 15-gallon stainless steel kettle fitted with a 4" x 15' packed distillation column connected to a condenser and receiver. This mixture was heated to a temperature of about 220° C., while 135.6 pounds of 96 per cent beta-hydroxy-ethyl cyanide and 7.8 pounds of acetic acid were passed into the kettle over a period of 8 hours. The condensate withdrawn from the receiver contained 103 pounds of vinyl cyanide, corresponding to a yield of 83.0 per cent of the theoretical.

While the above examples are limited to the use of aluminum oxide and basic aluminum acetate as catalysts, it is to be understood that any dehydration catalyst may be employed. Examples of such catalysts are sodium bisulphate, magnesium sulphate, activated bleaching earths, silica gel, activated charcoal, metallic aluminum, aluminum acetate, aluminum nitrate, etc. When metallic aluminum is used in the process it may react with the volatile organic acid to form an aluminum salt which also is a catalyst for the dehydration. Also, the principle of the invention may advantageously be applied to the preparation of higher unsaturated cyanides from higher beta-hydroxy-alkyl cyanides as well as mixtures thereof. For instance, it may be applied in preparing alpha-methyl-vinyl cyanide from alpha-methyl-beta-hydroxy-ethyl cyanide; beta-methyl-vinyl cyanide from beta-hydroxy-propyl cyanide; or alpha-ethyl-vinyl cyanide from alpha-ethyl-beta-hydroxy-ethyl cyanide, etc.

Other modes of applying the principle of our invention may be employed instead of those explained, change being made as regards the process herein described, provided the step or steps stated by any of the following claims or the equivalent of such stated step or steps be employed.

We therefore particularly point out and claim as our invention:

1. In a method of making alkenyl cyanides wherein a beta-hydroxy-alkyl cyanide is heated in the presence of a dehydration catalyst to evolve vapors comprising an alkenyl cyanide and water and the evolved vapors are condensed, the step of treating the moist alkenyl cyanide with acid, whereby the alkenyl cyanide is stabilized.

2. In a method of making alkenyl cyanides wherein a beta-hydroxy-alkyl cyanide is heated in the presence of a dehydration catalyst to distill therefrom a mixture comprising an alkenyl cyanide and water, the step of treating the distillate with sufficient acid to neutralize any ammonia therewith, whereby the alkenyl cyanide in said distillate is stabilized.

3. The method which comprises heating a mixture of a beta-hydroxy-alkyl cyanide and a volatile organic acid to a temperature not lower than its boiling temperature in the presence of a dehydration catalyst, whereby the beta-hydroxy-alkyl cyanide is dehydrated to form water and an alkenyl cyanide, evolving from the catalyst the resultant vapor mixture comprising water, alkenyl cyanide and volatile organic acid, and condensing the evolved vapors.

4. The method which comprises heating a mixture of a beta-hydroxy-alkyl cyanide and a volatile organic acid to boiling in the presence of a dehydration catalyst, while distilling therefrom a mixture of alkenyl cyanide, water, and the organic acid.

5. In a method wherein a beta-hydroxy-alkyl cyanide is heated to boiling in the presence of a dehydration catalyst while distilling off a mixture of an alkenyl cyanide and water, the step which consists in collecting the distillate in the presence of an acid, whereby the alkenyl cyanide in said distillate is stabilized.

6. The process which comprises heating a mixture of beta-hydroxy-ethyl cyanide and a small proportion of a volatile organic acid selected from the class consisting of formic and acetic acids to boiling in the presence of a dehydration catalyst while distilling a mixture of vinyl cyanide, water, and the organic acid from the reaction mixture.

7. In a method of preparing alkenyl cyanides, the steps which consist in heating a mixture of a beta-hydroxy-alkyl cyanide and a volatile organic acid to a temperature not lower than the boiling temperature of the mixture in the presence of a dehydration catalyst selected from the class consisting of aluminum and aluminum compounds, removing a vapor mixture of the alkenyl cyanide product, water, and the organic acid out of contact with the catalyst, and condensing the vapor mixture thus removed.

8. In a method of preparing alkenyl cyanides, the steps which consist in heating a mixture of a beta-hydroxy-alkyl cyanide and a volatile organic acid to boiling in the presence of a dehydration catalyst selected from the class consisting of aluminum and aluminum compounds while distilling off a mixture of the alkenyl cyanide product, water, and the organic acid.

9. In a method of preparing vinyl cyanide, the steps which consist in heating a mixture of beta-hydroxy-ethyl cyanide and a volatile organic acid to boiling in the presence of a dehydration catalyst selected from the class consisting of aluminum and aluminum compounds, while distilling off a mixture of vinyl cyanide, water, and the organic acid.

EDGAR C. BRITTON.
HOWARD S. NUTTING.
MYRON E. HUSCHER.